United States Patent

[11] 3,630,597

| [72] | Inventor | Kenneth Fraser Hulme<br>Malvern, England |
|---|---|---|
| [21] | Appl. No. | 2,509 |
| [22] | Filed | Jan. 13, 1970 |
| [45] | Patented | Dec. 28, 1971 |
| [73] | Assignee | Minister of Technology in Her Britannic Majesty's Government of the United Kingdom of Great Britain and Northern Ireland<br>London, England |
| [32] | Priority | Jan. 15, 1969 |
| [33] | | Great Britain |
| [31] | | 2,299/69 |

[54] ELECTRO-OPTIC DEVICES
6 Claims, 3 Drawing Figs.

[52] U.S. Cl............................................ 350/150, 350/157
[51] Int. Cl...................................................... G02f 1/26

[50] Field of Search............................................ 350/150, 157, 147, 157

[56] References Cited
UNITED STATES PATENTS

| 3,239,671 | 3/1966 | Buhrer............................ | 350/150 |
| 3,407,017 | 10/1968 | Fleisher et al.................... | 350/150 |
| 3,497,831 | 2/1970 | Hickey et al..................... | 350/150 X |
| 3,506,929 | 4/1970 | Ballman et al................... | 350/150 UX |

*Primary Examiner*—David Schonberg
*Assistant Examiner*—Paul R. Miller
*Attorney*—Hall, Pollock & Vande Sande ABSTRACT: An electro-optic modulating device comprises a modulating element which comprises a longitudinal electro-optic crystal having transparent conducting electrodes defining a radiation path oblique to the X, Y and Z directions of the crystal.

ELECTRO-OPTIC DEVICES

The present invention relates to electro-optic devices.

Electro-optic devices have been proposed as modulating elements for digital light deflectors. These deflectors are likely to be important in, for example, computer storage where they allow much information to be stored on a photographic plate in a very small space and at a low cost. Two current problems exist for modulators using the longitudinal electro-optic effect. The first is the amount of light lost by unwanted reflectors and absorptions, i.e., the need for the best possible transparent conducting electrodes. The second is that the electro-optic operating voltages are too high. Longitudinal electro-optic devices rely for their operation on crystals exhibiting the longitudinal electro-optic effect.

The Institute of Radio Engineers has published Standards of Piezoelectric crystals, in 1949, which define axes X, Y and Z, which are related to the crystallographic axes of a material. In every case of a prior device using the longitudinal electro-optic effect it has been arranged that radiation has been propagated along one of these axes X, Y, Z, especially the Z axis. The reasons for this are twofold. Firstly, the axes X, Y and Z relate to the atomic structure of the material and therefore it would seem obvious to arrange for the propagation direction to be along one of these axes, especially as at first sight the longitudinal half-wave voltages would apparently be at a minimum along directions related to the atomic structure (and this is in fact true for many materials). Secondly, the physics of radiation passing through an anisotropic crystal at an angle oblique to the X, Y or Z axes seems at first sight too complex and to involve unnecessary complications in a practical device.

I have now discovered that the longitudinal half-wave voltage in certain crystals reaches minimal values when the propagation of radiation through these crystals is at certain oblique angles to the axes X, Y and Z. One such crystal is that of lithium niobate, which has a minimum half-wave voltage of about 2.5 kv. at an angle of about 55° to the Z axis in the Y-Z plane. Unwanted inherent anisotropic effects in a crystal of lithium niobate when working at this angle are quite large, resulting in a relatively small usable angular aperture. However, these effects do not prove to be too troublesome after modification described below, and further, lithium niobate has the advantage over some other materials, many of which are used for known longitudinal electro-optic devices including potassium dihydrogen phosphate and its isomorphs which cannot be heated to a very great extent, that tin oxide, the best known transparent material for conducting electrodes, may be deposited directly on its surfaces at about 500° C. Another such crystal is that of lithium tantalate. This, however, produces reduced complications when working oblique to the axes X, Y, Z, because the angular aperture produced is sufficiently high, and the requirement of any modifications is reduced. (It is pointed out here that modifications, or means for compensating for effects due to inherent anisotrophy, become necessary where either the temperature sensitivity is too high or the angular aperture produced is too low, or both.)

According to the present invention there is provided an electro-optic polarization modulating device comprising at least one modulating element which comprises a longitudinal electro-optic crystal as hereinafter defined, transparent conducting electrodes situated on two of its faces, said transparent conducting electrodes and said faces defining a radiation path which is oblique to the axes X, Y and Z as hereinbefore defined of the said crystal, and means for applying voltages between said transparent conducting electrodes. The device may further comprise means for compensating for relative phase retardation of radiation produced in said modulating element due to inherent anisotropy.

By "longitudinal electro-optic crystal" is meant a crystal having two of its faces parallel or near parallel for the purpose of the introduction of electrodes to these faces, and exhibiting the electro-optic effect on radiation passing through the electrodes.

An embodiment of the invention will be described by way of example with reference to the accompanying drawings, in which.

Figure 1:
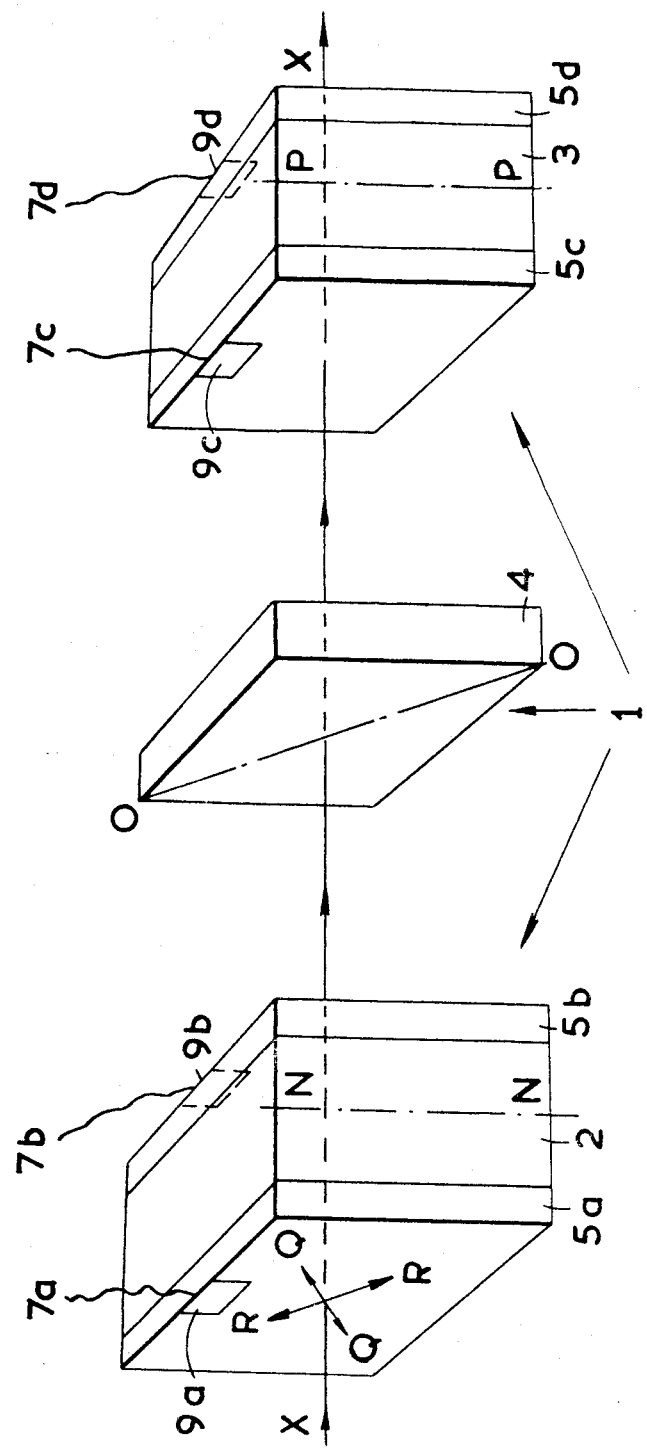
FIG. 1 is a diagram illustrating the construction of an electro-optic modulating device.

FIG. 1 is a diagram illustrating the construction of an electro-optic modulating device. Two identical electro-optic crystals 2, 3 of lithium niobate are separated by a half-wave retarder 4. On the main faces (those through which light passes) of the crystals 2, 3 are situated transparent conducting electrodes $5a$, $5b$, $5c$, $5d$. The material of the electrodes $5a$, $5b$, $5c$, $5d$ may be tin oxide. By means of leads $7_a$, $7_b$, $7_c$, $7_d$ connected to contact lands $9_a$, $9_b$, $9_c$, $9_d$ respectively, two electric potential differences may be applied between the pairs of electrodes $5_a$, $5_b$ and $5_c$, $5_d$. The fast axes of the crystals 2, 3 are in a vertical direction as indicated in FIG. 1 by the lines N—N, P—P respectively. This direction is used as a reference direction. The retarder 4 has its fast axis O—O at an angle of 45° to this direction. Light incident on the device in a direction x—x perpendicular to the plane of the electrode $5_a$ is linearly polarized at an angle of 45° to the reference direction. The radiation paths x—x through the crystals 2, 3 are both at the same oblique angle of 55° to the Z axis in the Y-Z plane at the angle of minimum required half-wave voltage.

The action of the device will now be described.

The retardation of light by the crystals 2, 3 is identical (assuming the identical crystals 2, 3 to have equal dimensions and temperatures), because the fast axes of the crystals 2, 3 are parallel. Also the effect of the crystals 2, 3 alone may be initially considered. Further, the effect of the crystals 2, 3 may be considered as two component effects. These are retardation produced by an optically anisotropic crystal not subjected to an applied electric field, and retardation due to electro-optically induced anisotropy in the crystal.

Figure 2:
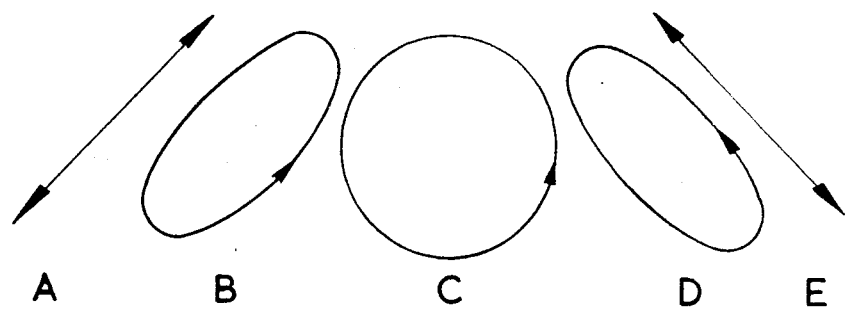
FIG. 2 is a diagram illustrating the effects of an electro-optic crystal with several different values of applied longitudinal electric field on light incident in a form linearly polarized at an angle of 45° to the fast axis of the crystal.
Figure 2:
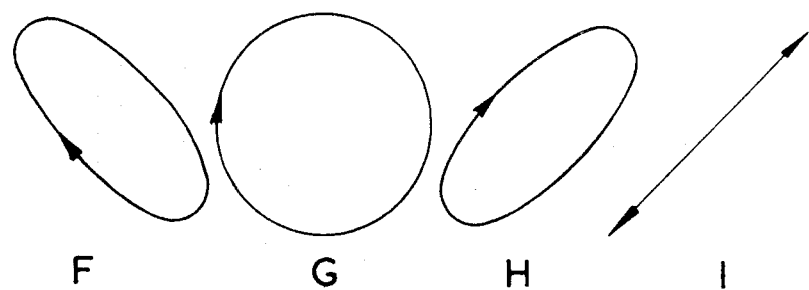

In FIG. 2 is a diagram illustrating the effects of an electro-optic crystal with several different values of applied longitudinal electric field on light incident in a form linearly polarized at an angle of 45° to the fast axis of the crystal. (For the purposes of explanation here, the relative phase retardation in the absence of an applied potential difference, that due to inherent anisotropy, is taken to be an integral number of $2\pi$ radians. The effects of departure from this condition are discussed below.) Linearly polarized light incident at an angle of 45° to the fast axis of a crystal, for example light with a polarization form as indicated in FIG. 1 by the line Q—Q incident on the crystal 2 will be converted successively to the forms represented by A, B, C, D, E, F, G, H and I in FIG. 2 in turn, for successive multiples of a quarter of the half-wave voltage by 0, 1, 2, 3, 4, 5, 6, 7 and 8 respectively, provided that the retardation according to a convention is positive. The forms A and I are linear at an angle of 45° to the fast axis of the above crystal (N—N or P—P in FIG. 1) and at an angle of 90° to the fast axis O—O of the retarder 4 in FIG. 1. The forms C and G are left circular and right circular respectively. The forms B, D, F and H are all elliptical with an ellipticity, i.e., ratio of major axis $a$ to minor $b$ given by the identity $$b/a = \tan 22\tfrac{1}{2}°$$

The forms B and D are left elliptical and the forms F and H right elliptical. The forms B and H have their major axes at an angle of 90° to the linear form E which is parallel to the fast axis O—O of the retarder 4 in FIG. 1, and the forms D and F have their major axes parallel to the forms A and I at an angle of 90° to the form E. If the retardation were negative then the forms would be encountered in the reverse direction, i.e., I to A. If the light were linearly polarized at the other possible angle of 45° to the fast axis of the crystal, that is, having a form as indicated by the line R—R in FIG. 1, then the succession of forms encountered would be E, D, C, B, A, H, G, F, and E in turn for applied voltages of 0, ¼, ½, ¾, 1, 1¼, 1½, 1¾, and 2 times the half-wave voltage respectively, for positive retardation. Likewise, for negative retardation the sequence would be E, F, G, H, I B, C and D. As the applied voltage is continuously increased, the polarization form of the light incident in one of the two above-specified forms gradually changes according to one of the above sequences but passes through many intermediate forms also.

It was taken above that the temperature and dimensions of the crystals 2, 3 are chosen so that the component of retardation due to inherent anisotropy is an integral multiple of $2\pi$ radians. This would be difficult to do in practice, so the more general case will now be discussed. Since light incident at the same angle, and the direction of the fast axes N—N, P—P of the crystals 2, 3 respectively remain fixed whether potential differences are applied across the crystals or not, then the form of the polarization obtained when no potential differences are applied, is in general elliptical because of retardation due to inherent anisotrophy, and does not depart from the appropriate one of the above four specified sequences, including all the intermediate forms. In other words, the two component effects described above of retardation are additive like two scalar quantities. The application of potential differences across the crystals 2, 3 would give rise to one of the above sequences, but because of the obliquity of the light propagation direction giving rise to another component of retardation, the sequence would in general start at another place.

Figure 3:
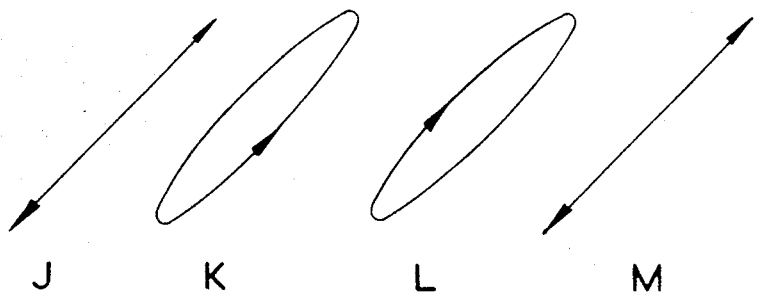
FIG. 3 is a diagram illustrating the effect of inserting between the crystals 2, 3 to be described with reference to FIG. 1, a half-wave retarder with its fast axis at an angle of 45° to a reference direction on light of a particular polarization form.

FIG. 3 is a diagram illustrating the effect of inserting between the crystals 2, 3 described with reference to FIG. 1, a half-wave retarder with its fast axis at an angle of 45° to a reference direction on light of a particular polarization form, i.e., here the presence of the retarder 4 in the device 1 is now considered. The reference direction is that of the fast axes of the crystals 2, 3 (N-N and P-P respectively). The situation described initially is that when one component effect of the crystals 2, 3 acts, namely retardation due to inherent anisotropy with no applied potential difference. The half-wave retarder 4 with its fast axis 0–0 in the direction shown in FIG. 1 has the property that it converts the polarization form of light emergent from the crystal 2 into a form of equal ellipticity and inclination of major axis but with opposite handedness. For example, if light of the polarization form J in FIG. 3 is incident on the crystal 2 and this emerges from the crystal 2 as the form K, which is left elliptical, then the effect of the retarder 4 on light of the form K is to convert it to light of the form L, which is similar to K in all respects, except that it is right elliptical. The action of the crystal 3 is to produce a relative phase retardation equal to that produced by the crystal 2. That is, the form L is altered to the form M which is identical to the form J. Thus, the effect of the retarder 4 is to produce the cancellation of any retardations at the crystals 2, 3 arising from inherent anisotropy.

Therefore, pure electro-optically induced retardation effects only need be further considered. If light of the forms described by either of the lines R-R, Q-Q in FIG. 1 is incident on the device 1, then because of the presence of the retarder 4, the application of equal potential differences of the same sign to the crystals 2, 3 has the same effect as above, i.e., no net retardation, the light passing through the device 1 being entirely unchanged in phase. However, if potential differences of equal magnitude ½$V_{\lambda/2}$ (the quarter-wave voltage) are applied to the crystals 2, 3 but with the signs of the potential differences being such that retardations of opposite sense are produced in the crystals 2 and 3, then the following will happen. Referring again to sequences in FIG. 2, light incident on the crystal 2 in FIG. 1 in the form A (Q-Q in FIG. 1) will be converted to the form C for positive retardation and to the form G for negative retardation. The effect of the half-wave retarder 4 on these would be to convert C to G and G to C. Since the crystal 3 has an applied potential difference so as to produce a retardation opposite in sense to that produced by the crystal 2, then instead of converting G to I and C to A, which it would do if the potential differences applied to the crystals 2, 3 were of the same sign it converts G to E and C to E. Likewise, if the initial form is E, then the final one is A. Thus light incident in either of the forms specified will change its linear polarization form to one rotated by an angle of 90°.

After modulation of the polarization, the two possible emergent forms could be separated by means of a discriminating element such as a Wollaston prism. The modulating device and discriminating element together could then constitute one stage of a digital light deflector.

I claim:

1. A modulating element for modulating an incident polarized beam of electromagnetic radiation comprising
   a. a longitudinal electro-optic crystal exhibiting in response to an applied electric field the electro-optic effect on electromagnetic radiation being propagated through it in the direction of said applied electric field, said crystal having
      1. two opposing plane parallel faces oriented such that a direction perpendicular to said faces is at an acute angle to all the crystallographic axes of said crystal and
      2. two conducting electrodes transparent to electromagnetic radiation applied to said two opposing plane parallel faces;
   b. means for propagating electromagnetic radiation through said crystal in a direction perpendicular to said two opposing plane parallel faces along a radiation path which is at an acute angle to all the crystallographic axes of said crystal; and
   c. means for applying voltages between said conducting electrodes.

2. An electro-optic modulating device comprising modulating element as claimed in claim 1, including means for compensating for relative phase retardation of radiation produced in said modulating element due to inherent anisotropy.

3. An electro-optic modulating device as in claim 2, comprising two of said modulating elements spaced from one another with their respective plane parallel faces parallel to one another, said means for compensating for relative phase retardation comprising a half-wave retarder situated between the two crystals of said two elements, said retarder having light-passing faces parallel to said crystal faces and having its fast axis at an angle of 45° to the fast axes of the longitudinal electro-optic crystals in said modulating elements.

4. An electro-optic modulating element as in claim 1, in which said electro-optic crystal is made of the material $liXO_3$, where X is an element selected from the group consisting of niobium and tantalum.

5. An electro-optic modulating device as in claim 2 in which said electro-optic crystal is made of the material $LiXO_3$ where X is an element selected from the group consisting of niobium and tantalum.

6. An electro-optic modulating device as in claim 3 in which said electro-optic crystals are made of the material $LiXO_3$, where X is an element selected from the group consisting of niobium and tantalum.

* * * * *